United States Patent
Lake, Jr. et al.

(10) Patent No.: US 10,131,751 B2
(45) Date of Patent: Nov. 20, 2018

(54) ADDITIVE COMPOSITION AND PROCESS FOR USING THE SAME

(71) Applicant: Milliken & Company, Spartanburg, SC (US)

(72) Inventors: K. David Lake, Jr., Spartanburg, SC (US); John D. Price, Moore, SC (US)

(73) Assignee: Milliken & Company, Spartanburg, SC (US)

(*) Notice: Subject to any disclaimer, the term of this patent is extended or adjusted under 35 U.S.C. 154(b) by 3 days.

(21) Appl. No.: 15/375,546

(22) Filed: Dec. 12, 2016

(65) Prior Publication Data

US 2017/0088678 A1 Mar. 30, 2017

Related U.S. Application Data

(62) Division of application No. 14/070,077, filed on Nov. 1, 2013.

(60) Provisional application No. 61/740,588, filed on Dec. 21, 2012.

(51) Int. Cl.
- *C08K 5/01* (2006.01)
- *C08J 3/20* (2006.01)
- *C08K 5/00* (2006.01)
- *C08K 5/098* (2006.01)

(52) U.S. Cl.
CPC ............ *C08J 3/203* (2013.01); *C08K 5/0083* (2013.01); *C08K 5/01* (2013.01); *C08K 5/098* (2013.01); *C08J 2323/06* (2013.01)

(58) Field of Classification Search
CPC .................................. C08J 3/203; C08K 5/01
USPC ........................................................ 524/394
See application file for complete search history.

(56) References Cited

U.S. PATENT DOCUMENTS

| | | |
|---|---|---|
| 5,049,605 A | 9/1991 | Rekers |
| 6,300,398 B1 | 10/2001 | Jiaianella et al. |
| 6,465,551 B1 | 10/2002 | Zhao et al. |
| 6,534,574 B1 | 3/2003 | Zhao et al. |
| 6,559,211 B2 | 5/2003 | Zhao et al. |
| 6,562,890 B2 | 5/2003 | Dotson |
| 6,599,968 B2 | 7/2003 | Zhao et al. |
| 6,599,971 B2 | 7/2003 | Dotson et al. |
| 6,794,433 B2 | 9/2004 | Dotson et al. |
| 7,094,820 B2 | 8/2006 | Zhao et al. |
| 7,157,510 B2 | 1/2007 | Xie et al. |
| 7,182,987 B2 | 2/2007 | Matthijs et al. |
| 7,262,236 B2 | 8/2007 | Xie et al. |
| 7,332,536 B2 | 2/2008 | Dotson et al. |
| 7,662,978 B2 | 2/2010 | Xie et al. |
| 8,198,351 B2 | 6/2012 | Xu et al. |
| 2003/0008956 A1 | 1/2003 | Zhao et al. |
| 2003/0136046 A1 | 7/2003 | Jackson et al. |
| 2010/0132886 A1 | 6/2010 | Rodriguez et al. |
| 2010/0204374 A1 | 8/2010 | Tanji et al. |
| 2011/0105664 A1 | 5/2011 | Dotson et al. |
| 2011/0200773 A1 | 8/2011 | Kolditz et al. |

FOREIGN PATENT DOCUMENTS

| | | |
|---|---|---|
| EP | 2 337 114 A1 | 7/2011 |
| EP | 2 559 726 A1 | 2/2013 |
| JP | 59-124949 A | 7/1984 |
| JP | 03-207738 A | 9/1991 |
| KR | 2010 0077500 A | 7/2010 |
| WO | WO 2012/162149 A1 | 11/2012 |

OTHER PUBLICATIONS

"High-Quality Dispersing Agents and Sole Carrier for Single Pigment Concentrates and Masterbatches", Clariant International Ltd., Gloal Marketing and Technical Center; Clariant Produkte (Deutschland) GmbH, Gersthofen, Germany, 2011.
"Licowax®, Ceridust®, Licolub®, Licomont®, Licocene® General leaflet—Waxes", Clariant International Ltd., Gloal Marketing and Technical Center; Clariant Produkte (Deutschland) GmbH, Gersthofen, Germany, 2010.
"Montan Waxes for Plastics Processing", Clariant GmbH, Pigments & Additives Division, Augsburg, Germany, Jun. 1999.
"Lubricants for Plastics Processing", Clariant International Ltd., Gloal Marketing and Technical Center; Clariant Produkte (Deutschland) GmbH, Gersthofen, Germany, 2010.
"Polywax® Polyethylenes", Release: BPPD 10-1, Baker Hughes Incorporated, 2002.
Database WPI, Week 201082, Thomson Scientific, London, GB; XP002719089,—& KR 2010 0077500A (Hyosung Corp), Jul. 8, 2010.
PCT/US2013/068063 International Search Report, filed Nov. 1, 2013, 4 pages.
PCT/US2013/068063 Written Opinion of the International Searching Authority, filed Nov. 1, 2013, 5 pages.

*Primary Examiner* — Deve E Valdez
(74) *Attorney, Agent, or Firm* — Robert M. Lanning

(57) ABSTRACT

An additive composition comprises a wax and a nucleating agent. The nucleating agent can be dispersed in the wax. A process for producing a nucleated polymer comprises the steps of (a) providing a reactor; (b) providing an additive composition comprising a wax and a nucleating agent; (c) providing an extruder; (d) reacting in the reactor a reactant mixture comprising an olefin monomer and hydrogen to produce a polyolefin polymer; (e) collecting and recovering the polyolefin polymer produced by the reaction; (f) conveying the polyolefin polymer to the extruder; (g) conveying the additive composition to the extruder; and (g) extruding the polyolefin polymer and the additive composition to produce a nucleated polymer composition.

17 Claims, No Drawings

ADDITIVE COMPOSITION AND PROCESS
FOR USING THE SAME

CROSS-REFERENCE TO RELATED
APPLICATIONS

This application is a division of co-pending U.S. patent application Ser. No. 14/070,077 filed on Nov. 1, 2013, which application claims, pursuant to 35 U.S.C. § 119(e), the benefit of the filing date of U.S. Patent Application No. 61/740,588 filed on Dec. 21, 2012.

TECHNICAL FIELD OF THE INVENTION

This application relates to additive compositions and processes for producing a nucleated polymer composition.

BACKGROUND

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer. Nucleating agents can also be used to improve the physical properties (e.g., flexural modulus or optical clarity) of the thermoplastic polymer as compared to the virgin, non-nucleated thermoplastic polymer.

While there are many benefits associated with the use of nucleating agents in thermoplastics, there are some difficulties associated with their use. For example, many nucleating agents are insoluble materials that need to be evenly dispersed in the polymer in order to efficiently nucleate the polymer. However, it can be difficult to adequately disperse the nucleating agent in the polymer using the equipment available during the polymer manufacturing process. For example, many polymer manufacturing operations do not have dispersive mixing capabilities in their extrusion process that can adequately disperse a powdered nucleating in the manufactured polymer. Accordingly, resin manufacturers have resorted to the use of masterbatch compositions to incorporate nucleating agents, which is a procedure that can be costly and complex as discussed below.

A need therefore remains for an improved process for incorporating a nucleating agent into a polymer during the manufacture of the polymer and an additive composition suitable for use in such process. The process and additive composition described herein are believed to meet such need.

BRIEF SUMMARY OF THE INVENTION

In a first series of embodiments, the invention provides an additive composition suitable for use in nucleating a polymer or polymer composition. The additive composition generally comprises a wax and a nucleating agent.

In a second series of embodiments, the invention generally provides a process for incorporating a nucleating agent into a polyolefin polymer to produce a nucleated polymer. The process is designed to facilitate the incorporation of the nucleating agent into the polymer during the polymer manufacturing process. The nucleating agent is incorporated into the polyolefin polymer as part of an additive composition comprising a wax and the nucleating agent. While not wishing to be bound to any particular theory, it is believed that using this additive composition permits the even dispersion of the nucleating agent in the polymer. The additive composition also provides flexibility insofar as the additive composition can be fed into the process in the form of a solid (e.g., pellet, prill, granule, etc.) or a molten liquid.

In a specific embodiment of such a process, the process comprises the steps of: (a) providing a reactor; (b) providing an additive composition comprising a wax and a nucleating agent; (c) providing an extruder; (d) reacting in the reactor a reactant mixture comprising an olefin monomer and hydrogen to produce a polyolefin polymer; (e) collecting and recovering the polyolefin polymer produced by the reaction; (f) conveying the polyolefin polymer to the extruder; (g) conveying the additive composition to the extruder; and (g) extruding the polyolefin polymer and the additive composition to produce a nucleated polymer composition.

DETAILED DESCRIPTION OF THE
INVENTION

As noted above, the invention provides an additive composition. The additive composition is suitable for use in nucleating a polymer, such as a polyolefin polymer (e.g., a polyethylene polymer), or a polymer composition, such as a composition comprising a polyolefin polymer (e.g., a thermoplastic elastomer). The additive composition generally comprises a wax and a nucleating agent.

The wax of the additive composition can be any suitable wax. Suitable waxes include, but are not limited to, those selected from the group consisting of animal waxes, plant waxes, paraffin waxes, microcrystalline waxes, polyolefin waxes, Fischer-Tropsch waxes, and mixtures thereof. The choice of a suitable wax for the additive composition can be influenced by the properties of the polymer and/or polymer composition to which the additive composition will be added. For example, the wax preferably has a melting point that is less than or equal to the melting point of the target polymer or the polymer to be nucleated in the target polymer composition. This will ensure that the wax melts during processing to produce a molten liquid that can be thoroughly and evenly mixed with the target polymer, which in turn thoroughly and evenly disperses the nucleating agent in the polymer. Thus, the choice of a suitable wax for the additive composition can depend, at least in part, on the particular polymer being nucleated and the melting point of this polymer. Furthermore, the choice of a suitable wax may also depend upon the application(s) for which the polymer is intended. For example, if the polymer is intended for use in food contact applications, the wax preferably is one that has been recognized as safe for use in such food contact applications.

In some instances, it is believed to be preferable to use a wax having a chemical composition that is similar to the polymer being nucleated. While not wishing to be bound to any particular theory, it is believed that using such a wax will minimize any changes to the polymer's properties arising from the introduction of the wax. In other words, when the wax exhibits a similar chemical composition to the polymer, it is believed to essentially resemble a low molecular weight fraction that is already present in the polymer. Therefore, it is believed that the introduction of the wax will have a minimal impact on the properties of the polymer. Thus, in a preferred embodiment of the additive composition intended for use in nucleating polyolefin compositions, the wax of the additive composition is selected from the group consisting of polyolefin waxes. More specifically, the wax preferably is a polyolefin wax selected from the same type of polyolefin being nucleated. Accordingly, if a polyethylene polymer is being nucleated, the wax preferably is selected from the group consisting of polyethylene waxes. Furthermore, Applicants believe it may be appropriate to select a polyolefin wax that has been produced with a similar catalyst system to that used to produce the polyolefin polymer. Accordingly, if the polyolefin polymer is a polyethylene produced with a Ziegler-Natta catalyst, the wax can be a polyethylene wax produced with a Ziegler-Natta catalyst.

The wax can be present in the additive composition in any suitable amount. Preferably, the wax is present in the additive composition in an amount of about 60 wt. % or more based on the total weight of the additive composition. More preferably, the wax can be present in the additive composition in an amount of about 65 wt. % or more, about 70 wt. % or more, or about 75 wt. % or more based on the total weight of the additive composition.

The nucleating agent of the additive composition can be any suitable nucleating agent. The term "nucleating agent" is used herein to refer to a substance that forms nuclei or provides sites for the formation and/or growth of crystals in a thermoplastic polymer as it solidifies from a molten state. The nucleating agent can be a soluble nucleating agent or an insoluble nucleating agent. The term "soluble nucleating agent" refers to a nucleating agent that will dissolve in a molten polymer, and the term "insoluble nucleating agent" refers to a nucleating agent that will not dissolve in a molten polymer. Suitable soluble nucleating agents include, but are not limited to, acetal compounds that are the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based nucleating agents include, but are not limited to, the clarifying agents disclosed in U.S. Pat. Nos. 5,049,605; 7,157,510; 7,262,236; and 7,662,978, the disclosures of which are hereby incorporated by reference in their entirety. Suitable soluble nucleating agents also include trisamide nucleating agents, such as amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof.

Applicants believe that the additive composition of the invention is particularly suited for use with insoluble nucleating agents. This is due to the fact that insoluble nucleating agents do not dissolve in a molten polymer and, therefore, can be difficult to evenly disperse in the polymer. Thus, in a preferred embodiment, the nucleating agent is an insoluble nucleating agent. Suitable insoluble nucleating agents include, but are not limited to, mineral-based nucleating agents (e.g., phyllosilicates such as talc, mica, kaolin, halloysite, etc.) and salts of organic acids, such as alkali metal salts of organic acids (e.g., lithium, sodium or potassium salts), alkaline earth metal salts of organic acids (e.g., magnesium or calcium salts), transition metal salts of organic acids (e.g., manganese or zinc salts), and post-transition metal salts of organic acids (e.g., aluminum salts).

There are a variety of inorganic acids that can be used to produce such nucleating agents. Suitable nucleating agents include, but are not limited to, benzoic acid salts (e.g., sodium benzoate), phosphate ester salts, bicyclic alkane dicarboxylate salts, cycloalkane dicarboxylate salts, benzenesulfonic acid salts, mandelic acid salts, and combinations thereof. Suitable benzenesulfonic acid salts include, but are not limited to, zinc benzenesulfonate and the other benzenesulfonic acid salts disclosed, for example, in U.S. Pat. No. 8,198,351 (Xu et al.), the disclosure of which is hereby incorporated by reference. Suitable mandelic acid salts include, but are not limited to, zinc mandelate and the other mandelic acid salts disclosed, for example, in U.S. Patent Application Publication No. 2011/0105664 A1 (Dotson et al.), the disclosure of which is hereby incorporated by reference.

Suitable phosphate ester salts include, but are not limited to, the bisphenol phosphate ester salts conforming to the structure of Formula (I) below

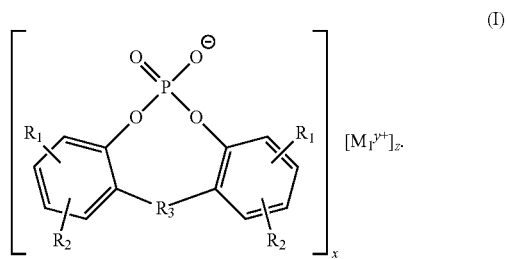

In the structure of Formula (I), $R_1$ and $R_2$ can be attached at any suitable position on the aryl rings and are independently selected from the group consisting of hydrogen, alkyl groups (preferably $C_1$-$C_{18}$ alkyl groups), and cycloalkyl groups (preferably $C_3$-$C_{12}$ cycloalkyl groups). In a preferred embodiment, $R_1$ and $R_2$ are independently selected from the group consisting of alkyl groups, more preferably $C_1$-$C_9$ alkyl groups. In a more preferred embodiment, $R_1$ and $R_2$ are each tert-butyl groups. $R_3$ is selected from the group consisting of a carbon-carbon bond (i.e., a bond between the carbon atoms of the two aryl rings), a divalent sulfur atom, and alkanediyl groups. In a preferred embodiment, $R_3$ is an alkanediyl group. Suitable alkanediyl groups include, but are not limited to, alkanediyl groups conforming to the structure of Formula (II)

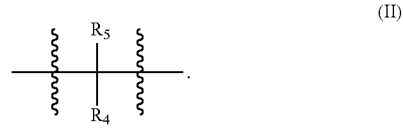

In the structure of Formula (II), $R_4$ and $R_5$ are independently selected from the group consisting of hydrogen, alkyl groups (preferably $C_1$-$C_{18}$ alkyl groups), and cycloalkyl groups (preferably $C_3$-$C_{12}$ cycloalkyl groups), including cycloalkanediyl groups in which $R_4$ and $R_5$ form part of the cycloalkanediyl group. Each $M_1$ is a metal cation, y is the valence of the metal cation, and z is a positive integer. The values of x, y, and z satisfy the equation x=y·z.

Suitable bisphenol phosphate ester salts can conform to the structure of Formula (III) below

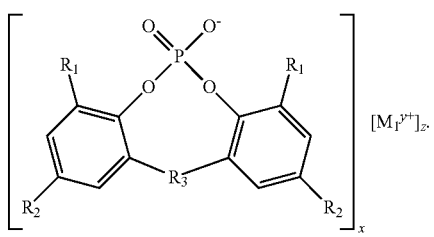

(III)

In the structure of Formula (III), $R_1$ and $R_2$ are independently selected from the group consisting of hydrogen and alkyl groups (preferably $C_1$-$C_{18}$ alkyl groups). In a preferred embodiment, $R_1$ and $R_2$ are independently selected from the group consisting of alkyl groups, more preferably $C_1$-$C_9$ alkyl groups. In a more preferred embodiment, $R_1$ and $R_2$ are each tert-butyl groups. $R_3$ is an alkanediyl group, including those alkanediyl groups described above in connection with the structure of Formula (I). In a preferred embodiment, $R_3$ is an alkanediyl group conforming to the structure of Formula (IV)

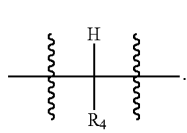

(IV)

In the structure of Formula (IV), $R_4$ is selected from the group consisting of hydrogen and alkyl groups (preferably $C_1$-$C_4$ alkyl groups). In a preferred embodiment, $R_3$ is an alkanediyl group conforming to the structure of Formula (IV) and $R_4$ is hydrogen. Each $M_1$ is a metal cation, y is the valence of the metal cation, and z is a positive integer. The values of x, y, and z satisfy the equation x=y·z.

Specific examples of bisphenol phosphate ester salts suitable for use as the nucleating agent include, but are not limited to, 2,2'-methylene-bis-(4,6-di-tert-butylphenyl) phosphate salts, such as sodium 2,2'-methylene-bis-(4,6-di-tert-butylphenyl) phosphate and aluminum 2,2'-methylene-bis-(4,6-di-tert-butylphenyl)phosphate.

Suitable nucleating agents also include bicyclic alkane dicarboxylate salts, such as the dicarboxylate salts of bicyclo [2.2.1]heptane. Suitable bicyclic alkane dicarboxylate salts are disclosed, for example, in U.S. Pat. No. 6,465,551 (Zhao et al.), U.S. Pat. No. 6,534,574 (Zhao et al.), U.S. Pat. No. 6,559,211 (Zhao et al.), U.S. Pat. No. 6,599,968 (Zhao et al.), and U.S. Pat. No. 7,094,820 (Zhao et al.), the disclosures of which are hereby incorporated by reference. Specific examples of bicyclic alkane dicarboxylate salts suitable for use as the nucleating agent include, but are not limited to, disodium bicyclo[2.2.1]heptane-2,3-dicarboxylate and calcium bicyclo[2.2.1]heptane-2,3-dicarboxylate.

Suitable nucleating agents also include cycloalkane dicarboxylate salts, such as the dicarboxylate salts of cyclohexane (i.e., salts of hexahydrophthalic acid). Suitable cycloalkane dicarboxylate salts are disclosed, for example, in U.S. Pat. No. 6,562,890 (Dotson), U.S. Pat. No. 6,599,971 (Dotson et al.), U.S. Pat. No. 6,794,433 (Dotson et al.), and U.S. Pat. No. 7,332,536 (Dotson et al.), the disclosures of which are hereby incorporated by reference. Specific examples of cycloalkane dicarboxylate salts suitable for use as the nucleating agent include, but are not limited to, disodium cyclohexane-1,2-dicarboxylate, calcium cyclohexane-1,2-dicarboxylate, aluminum hydroxide cyclohexane-1,2-dicarboxylate, dilithium cyclohexane-1,2-dicarboxylate, and strontium cyclohexane-1,2-dicarboxylate.

For the bicyclic alkane dicarboxylate salts and the cycloalkane dicarboxylate salts, the carboxylate moieties preferably are located on adjacent carbon atoms. These carboxylate moieties can be arranged in either the cis- or trans-configuration, with the cis-configuration being preferred.

In a preferred embodiment of the additive composition, the nucleating agent is a metal salt of a cyclohexane-1,2-dicarboxylic acid. Preferably, the nucleating agent is an alkaline earth metal salt of a cyclohexane-1,2-dicarboxylic acid, such as calcium cyclohexane-1,2-dicarboxylate (e.g., calcium cis-cyclohexane-1,2-dicarboxylate).

Some of the salts of organic acids used as nucleating agents can exist in either a hydrated or anhydrous state (i.e., with or without waters of hydration). While it is believed that either form of such nucleating agents can be used in the additive composition of the invention, it is generally preferred for the nucleating agent to be in an anhydrous state (i.e., the nucleating agent does not have waters of hydration). Thus, in the preferred embodiment in which the nucleating agent is a metal salt of a cyclohexane-1,2-dicarboxylic acid, the nucleating preferably is an anhydrous metal salt of a cyclohexane-1,2-dicarboxylic acid, such as anhydrous calcium cyclohexane-1,2-dicarboxylate (e.g., anhydrous calcium cis-cyclohexane-1,2-dicarboxylate).

The nucleating agent can be present in the additive composition in any suitable amount. The amount of nucleating agent present in the additive composition can affect the viscosity of the molten additive composition. These viscosity affects can place limitations on the ways in which the additive composition can be used to nucleate the target polymer. For example, an additive composition that is highly viscous in the molten state may not evenly disperse with the target polymer in conventional mixing and/or extrusion equipment. This would negatively affect the efficacy of the additive composition. Also, an additive composition that is highly viscous in the molten state may not be suitable for melting and pumping as described below in connection with the process of the invention. Even further, it can be difficult to evenly disperse in a polymer the nucleating agent from an additive composition having a relatively high amount of nucleating agent. This is believed to be due to the fact that high amounts of the nucleating agent can lead to the formation of agglomerates within the additive composition, and these agglomerates do not readily break up or disperse in the polymer. Thus, the suitable amount of nucleating agent in the additive composition is driven by two main considerations. On the one hand, the concentration of nucleating agent preferably is kept low enough that the additive composition is not overly viscous in the molten state and does not contain significant amounts of agglomerates of the nucleating agent. On the other hand, the concentration of nucleating agent in the additive composition preferably is high enough that the end user will not be required to consume a large volume of the additive composition in order to achieve the desired loading of nucleating agent in the target polymer.

Preferably, the nucleating agent is present in the additive composition in an amount of about 0.5 wt. % or more, about 1 wt. % or more, about 1.5 wt. % or more, about 2 wt. % or more, about 2.5 wt. % or more, about 3 wt. % or more, about 3.5 wt. % or more, about 4 wt. % or more, about 4.5 wt. % or more, or about 5 wt. % or more based on the total weight of the additive composition. In another preferred embodiment, the nucleating agent preferably is present in the additive composition in an amount of about 30 wt. % or less, about 29 wt. % or less, about 28 wt. % or less, about 27 wt. % or less, about 26 wt. % or less, or about 25 wt. % or less based on the total weight of the additive composition. Thus, in a series of preferred embodiments, the nucleating agent is present in the additive composition in an amount of about 0.5 to about 30 wt. % (e.g., about 0.5 to about 25 wt. %) or about 1 to about 25 wt. %.

The additive composition can contain other components in addition to the wax and the nucleating agent. For example, the additive composition can contain other types of polymer additives, such as antioxidants, acid scavengers or neutralizers, blocking agents (anti-blocks), slip agents, light stabilizers, fillers, reinforcing agents, and colorants (e.g., pigments or dyes). While the additive composition can contain such additional ingredients, the additive composition preferably contains at most only a minor amount of a thermoplastic polymer. More specifically, the additive composition preferably contains about 20 wt. % or less, about 15 wt. % or less, about 10 wt. % or less, about 5 wt. % or less, or about 1 wt. % or less of a thermoplastic polymer based on the total weight of the additive composition.

The nucleating agent preferably is dispersed within the wax of the additive composition. In other words, the wax preferably provides a matrix in which particles of the nucleating agent are substantially evenly dispersed. While not wishing to be bound to any particular theory, it is believed that evenly dispersing the nucleating agent in the wax will ensure that the nucleating agent becomes evenly distributed in the target polymer. As noted above, even dispersion of the nucleating agent in the polymer is believed to improve the efficacy of the nucleation.

The above-described dispersion of the nucleating agent in the wax can be produced by any suitable means. For example, the additive composition can be produced by melting the wax and thoroughly mixing the nucleating agent with the molten wax. The additive composition can then be rendered in any form suitable for use in nucleating the target polymer.

While it is not necessary for the practice of all embodiments of the invention, the additive composition preferably is provided in the form of a plurality of discrete particles. For example, the additive composition can be provided in the form of, inter alia, pellets, prills, granules, or flakes. Pellets of the additive composition can be produced by any suitable pelletization process, such as an underwater pelletization process or a drop pelletization process. Prills of the additive composition can be produced by, for example, spraying the molten mixture of wax and nucleating agent from a nozzle.

The additive composition of the invention can be used in any suitable manner to nucleate a target polymer or a target polymer composition. For example, the additive composition of the invention can be blended with pellets of a manufactured polymer, and the resulting mixture extruded to produce a nucleated polymer composition. The additive composition can also be added via a side feed throat on an extruder through which the target polymer is being extruded. Alternatively, it is believed that the additive composition of the invention can be used by a polymer manufacturer to nucleate the target polymer prior to the pelletization step of a traditional polymer manufacturing process. This manner of using the additive composition of the invention is described in further detail below.

As noted above, the invention also provides a process for producing a nucleated polymer. The process generally comprises the steps of (a) providing a reactor; (b) providing an additive composition comprising a wax and a nucleating agent; (c) providing an extruder; (d) reacting in the reactor a reactant mixture comprising an olefin monomer and hydrogen to produce a polyolefin polymer; (e) collecting and recovering the polyolefin polymer produced by the reaction; (f) conveying the polyolefin polymer to the extruder; (g) conveying the additive composition to the extruder; and (g) extruding the polyolefin polymer and the additive composition to produce a nucleated polymer composition.

The process steps recited above typically are performed as part of a polymer manufacturing process. Thus, the additive composition is incorporated into the polyolefin polymer before the freshly-made polymer exits the extruder as pellets or granules. This stands in contrast to other post-production methods for incorporating nucleating agents into polymers, which are performed by extruding pellets or granules of a previously-manufactured polymer with the nucleating agent and, optionally, other additives. While not wishing to be bound to any particular theory, it is believed that using the process of the invention to introduce the nucleating agent improves the dispersion of the nucleating agent in the polymer, which in turn enables the nucleating agent to more efficiently nucleate the polymer. This produces a polymer exhibiting more consistent improvements in properties (e.g., physical properties).

While nucleating agents can be introduced to the polymer during the manufacturing process, the known techniques for doing so are fraught with difficulties. For example, nucleating agents typically are sold in the form of powders or masterbatch compositions. Powdered nucleating agents can be difficult to handle and accurately feed at the required levels. In order to be compatible with the polymer manufacturing process, a pelletized masterbatch composition typically contains only a relatively minor amount of nucleating agent, such as about 5 wt. % or less. This means that a relatively large volume of the masterbatch composition must be used during the manufacturing process, which drives up the cost and complexity of the manufacturing process.

Thus, it is believed that the additive composition utilized in the process of the invention, which comprises a wax and a nucleating agent, is well-suited for overcoming the impediments that have heretofore complicated efforts to incorporate nucleating agents during the production of polymers. For example, it is believed that the use of a wax as a vehicle for carrying the nucleating agent addresses several problems. First, polyolefin polymers typically contain minor amounts of low molecular weight fractions that will be similar in composition and/or properties to the wax used in the additive composition. Therefore, the use of a wax does not introduce a material into the polyolefin polymer that might adversely affect the desired properties of the polyolefin polymer. Second, the wax typically has a lower melting point and/or a lower melt viscosity than the polyolefin polymer being produced. This ensures that the additive composition is thoroughly and evenly mixed with the polyolefin polymer when the polymer and additive composition are finally extruded. Such thorough and even mixing leads to the even dispersion of the nucleating agent in the polyolefin polymer. The properties of the wax also mean that the additive composition can be fed into the production process using equipment that is typically used to feed other additives having relatively low melting points that can be melted and fed in the form of pumpable liquids, such as antioxidants. Third, the additive composition can be provided as a pellet, prill, or in another particulate form. This flexibility in the physical form of the additive composition overcomes many of the difficulties associated with the handling of nucleating agents that would otherwise be provided in powdered form. Fourth, it is believed that the nucleating agent can comprise a relatively large percentage of the additive composition (e.g., up to about 20 wt. % or more), which permits the use of a smaller volume of additive composition as compared to a traditional masterbatch composition. It is this set of combined benefits that Applicants believe make this additive composition and process well-suited to incorporating nucleating agents in polymers.

The additive composition used in the process of the invention can be any suitable additive composition comprising a wax and a nucleating agent. For example, the additive composition can be any of those described above in connection with the additive composition embodiment of the invention. In this process embodiment of the invention, the amount of wax in the nucleating agent can be lower than some of the amounts specifically listed above in connection with the discussion of the additive composition embodiments, but the amount of wax and nucleating agent should still be in a range that produces an additive composition that is not too viscous in the molten state.

It is believed that the process of the invention can be used in connection with any known process for manufacturing a polyolefin polymer. For example, it is believed that the process can be used in conjunction with any known "low pressure" catalytic processes for producing polyolefin polymers (e.g., polyethylene polymers). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or staged reactor polymerization processes. The suitable gas-phase polymerization processes also include the so-called "condensed mode" or "super-condensed mode" processes in which a liquid hydrocarbon is introduced into the fluidized-bed to increase the absorption of the heat producing during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers. Suitable processes also include those in which a pre-polymerization step is performed. In this pre-polymerization step, the catalyst typically is exposed to the cocatalyst and olefin monomer under mild conditions in a smaller, separate reactor, and the polymerization reaction is allowed to proceed until the catalyst comprises a relatively small amount (e.g., about 5% to about 30% of the total weight) of the resulting composition. This pre-polymerized mixture is then introduced to the large-scale reactor in which the remainder of the polymerization reaction is to be performed.

In each of the processes described above, a reactor (or a series of reactors) is used to carry out the polymerization reaction in the presence of one or more catalysts. Suitable catalysts are known to those familiar with the art and are described, for example, in U.S. Pat. No. 8,198,351 (Xu et al.), the disclosure of which is hereby incorporated by reference. In the reactor, a reactant mixture comprising the olefin monomer and hydrogen are reacted to produce the polyolefin polymer.

After it is produced in the reactor, the polyolefin polymer is collected so that it can be conveyed to later stages of the production process. The manner in which the polyolefin polymer is collected depends upon the particular production process that was used. For example, in solution polymerization processes, the polyolefin polymer exits the reactor in the form of a solution. Therefore, the collection process entails the removal of the solvent leaving a process stream that is rich in the polyolefin polymer (i.e., it contains a higher amount of polymer than the stream exiting the reactor). In solution polymerization processes, the solvent can removed is a series of successive steps, with each step being tailored to effectively remove solvent from a mixture or process stream containing increasingly higher amounts of the polymer and lower amounts of solvent. The process stream typically is maintained at an elevated temperature so that it remains a molten liquid through the collection and solvent removal steps. In slurry polymerization processes, the polyolefin polymer exits the reactor in the form of a dispersion of solid polyolefin polymer particles in an organic carrier liquid. Therefore, the collection process similarly entails the removal of the carrier liquid, which is usually performed by a devolatilization process. In gas phase polymerization processes, the polyolefin polymer exits the reactor in a solid form and, therefore, the polymer need not be separated from a carrier liquid or solvent. However, the collection process typically entails a degassing step in which the solid polymer is separated from unreacted polyolefin monomer gas (e.g., ethylene gas) and any other gas used to produce the fluidized bed inside the reactor.

After recovery and collection, the polyolefin polymer is conveyed to the extruder where it is pelletized to produce the finished polymer. In processes that produce solid polymer in the reactor, such as gas phase and slurry polymerization processes, the polymer is typically conveyed to the extruder in the form of a solid, which is frequently referred to as reactor fluff or flake. As it is conveyed to the extruder, the reactor fluff or flake can be mixed with additives, such as antioxidants and acid scavengers. The additives typically are mixed with the reactor fluff or flake upstream from the feed throat of the extruder. In processes that produce polymer in the form of a molten liquid, such as solution polymerization processes, the polymer is maintained at an elevated temperature so that it is conveyed to the extruder in the form of a molten liquid. The molten polymer typically is then combined with any additives, such as antioxidants and/or acid scavengers, in the extruder. For example, the molten polymer can be introduced to the extruder via the main feed throat and the additives can be introduced to the extruder via one or more side feed throats, which side feed throats can be disposed at various locations along the length of the extruder screw upstream from the die.

The additive composition can be introduced at a variety of points in the polymer manufacturing process. For example, the additive composition can be mixed with the polyolefin polymer at any point prior to their introduction into the extruder. In such case, the polyolefin polymer and the additive composition can both be in solid form when mixed, or one or both can be a liquid when mixed. For example, the additive composition can be heated to a temperature sufficient to melt the wax and produce a molten additive composition, and this molten additive composition can then be mixed with the polyolefin polymer, which can be in either a solid or liquid state. In another example, the polyolefin polymer and the additive composition can be simultaneously fed to the feed throat of the extruder. Once again, in such case, the polymer and the additive composition can both be in a solid form when fed to the feed throat, or one or both can be a liquid. Thus, the additive composition can be heated to a temperature sufficient to melt the wax and produce a molten additive composition. The polyolefin polymer can also be a molten liquid when introduced to the extruder, such as the molten liquid stream produced by a solution polymerization processes.

The additive composition can also be introduced to the process and mixed with the polyolefin polymer in the extruder itself. For example, the extruder can comprise one or more side feed throats, which are located between the first feed throat (i.e., the feed throat through which the polymer is introduced to the extruder) and the die from which material exits the extruder. The additive composition can be introduced to the extruder using any one of these side feed throats, provided the location still provides ample time and mixing within the extruder for the additive composition to be thoroughly mixed with the polymer. Furthermore, the additive composition can be introduced to one or more of these side feed throats in the form of a solid or a molten liquid.

The additive composition can be mixed with other additives prior to its introduction. For example, the additive composition can be mixed with the antioxidants, stabilizers, and/or acid scavengers typically added to the polymer. This arrangement may be advantageous for several reasons. For example, it enables the manufacturer to utilize on-hand equipment (e.g., equipment used to add an antioxidant) to introduce the additive composition to the polymer. Second, it reduces the number of distinct points at which a separate material must be incorporated into the polymer, which should reduce the overall complexity of the manufacturing process.

The additive composition can be added to the polyolefin polymer in any suitable amount. The suitable amount will depend on at least two factors: the desired concentration of nucleating agent in the polymer; and the concentration of the nucleating agent in the additive composition. Preferably, the additive composition is added to the polymer in an amount sufficient to yield a concentration of nucleating agent in the polymer of about 100 ppm or more, about 200 ppm or more, about 250 ppm or more, about 300 ppm or more, about 400 ppm or more, or about 500 ppm or more based on the weight of the polyolefin polymer. The additive composition preferably is added to the polymer in an amount sufficient to yield a concentration of nucleating agent in the polymer of about 5,000 ppm or less, about 4,500 ppm or less, about 4,000 ppm or less, about 3,500 ppm or less, or about 3,000 ppm or less based on the weight of the polyolefin polymer.

Thus, in a series of preferred embodiments, the additive composition is added to the polymer in an amount sufficient to yield a concentration of nucleating agent in the polymer of about 100 to about 5,000 ppm, about 200 to about 4,500 ppm, about 250 to about 4,000 ppm, about 250 to about 3,500 ppm, or about 250 to about 3,000 ppm based on the weight of the polyolefin polymer.

As noted above, the process described above is believed to be suitable for use in the production of any polyolefin polymer by any of the known production processes. For example, it is believed that the process can be used in the production of a polypropylene, a polyethylene, a polybutylene, or a poly(4-methyl-1-pentene). Suitable polymers include polypropylene homopolymers (e.g., atactic polypropylene, isotactic polypropylene, and syndiotactic polypropylene), polypropylene copolymers (e.g., polypropylene random copolymers), polyethylene, polyethylene copolymers, polybutylene, poly(4-methyl-1-pentene), and mixtures thereof. Suitable polypropylene copolymers include, but are not limited to, random copolymers made from the polymerization of propylene in the presence of a comonomer selected, for example, from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %).

In one preferred embodiment, the process is used to produce a polyethylene polymer. Suitable polyethylene polymers include, but are not limited to, low density polyethylene, linear low density polyethylene, medium density polyethylene, high density polyethylene, and combinations thereof. These polyethylene polymers and the processes for producing the same are described more fully in U.S. Pat. No. 8,198,351 (Xu et al.), the disclosure of which is hereby incorporated by reference.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A process for producing a nucleated polymer composition, the process comprising the steps of:
   (a) providing a reactor;
   (b) providing an additive composition, the additive composition comprising a wax and a nucleating agent;
   (c) providing an extruder;
   (d) reacting in the reactor a reactant mixture comprising an olefin monomer and hydrogen to produce a polyolefin polymer;
   (e) collecting and recovering the polyolefin polymer produced by the reaction;
   (f) conveying the polyolefin polymer to the extruder;
   (g) conveying the additive composition to the extruder; and
   (g) extruding the polyolefin polymer and the additive composition to produce a nucleated polymer composition.

2. The process of claim 1, wherein, in step (e), the polyolefin polymer is collected and recovered in a form selected from the group consisting of a powder, a molten liquid, and a solution in a solvent.

3. The process of claim 2, wherein the polyolefin polymer is introduced into the extruder in the form of a powder or a molten liquid.

4. The process of claim 1, wherein the polyolefin polymer and additive composition are mixed prior to introduction into the extruder.

5. The process of claim 4, wherein, prior to mixing with the polyolefin polymer, the additive composition is heated to a temperature sufficient to melt the wax and produce a molten additive composition.

6. The process of claim 1, wherein the extruder comprises a feed throat for introducing material into the extruder, and wherein the polyolefin polymer and additive composition are simultaneously fed to the feed throat.

7. The process of claim 6, wherein, prior to feeding to the feed throat, the additive composition is heated to a temperature sufficient to melt the wax and produce a molten additive composition.

8. The process of claim 1, wherein the extruder comprises a die from which extruded material exits the extruder, a first feed throat for introducing material into the extruder, and a side feed throat, for introducing additional material to the extruder, the side feed throat being located between the first feed throat and the die, and wherein the additive composition is introduced into the extruder via the side feed throat.

9. The process of claim 1, wherein the olefin monomer is ethylene and the polyolefin polymer is a polyethylene.

10. The process of claim 1, wherein the wax is selected from the group consisting of animal waxes, plant waxes, paraffin waxes, microcrystalline waxes, polyolefin waxes, FischerTropsch waxes, and mixtures thereof.

11. The process of claim 10, wherein the wax is a polyolefin wax.

12. The process of claim 1, wherein the nucleating agent is a salt of an organic acid.

13. The process of claim 12, wherein the nucleating agent is a metal salt of a cyclohexane-1,2-dicarboxylic acid.

14. The process of claim 13, wherein the nucleating agent is calcium cis-cyclohexane-1,2-dicarboxylate.

15. The process of claim 1, wherein the additive composition comprises about 1 to about 25% by weight nucleating agent.

16. The process of claim 1, wherein the nucleating agent is substantially evenly dispersed in the wax of the additive composition.

17. The process of claim 1, wherein the additive composition is added to the polyolefin polymer in an amount sufficient to yield a concentration of nucleating agent in the nucleated polymer composition of about 100 to about 5,000 parts-per-million based on the weight of the polyolefin polymer.

* * * * *